US005813654A

United States Patent [19]

Hopley

[11] Patent Number: 5,813,654

[45] Date of Patent: Sep. 29, 1998

[54] ELECTRICALLY OPERATED TRIGGER VALVE FOR FUEL INJECTION PUMP

[75] Inventor: Daniel Jeremy Hopley, Gillingham, England

[73] Assignee: Lucas Industries, Solihull, Great Britain

[21] Appl. No.: 842,440

[22] Filed: Apr. 24, 1997

[30] Foreign Application Priority Data

Apr. 26, 1996 [GB] United Kingdom .................... 9608703

[51] Int. Cl.[6] .................................................... F16K 31/02

[52] U.S. Cl. .................. 251/129.02; 251/64; 251/129.16

[58] Field of Search ................................ 251/129.02, 64, 251/129.16

[56] References Cited

U.S. PATENT DOCUMENTS

| | | | |
|---|---|---|---|
| 3,810,485 | 5/1974 | Gawlick et al. | 251/64 |
| 5,076,538 | 12/1991 | Mohr et al. | 251/129.02 |
| 5,167,442 | 12/1992 | Alaze et al. | 251/129.02 |
| 5,358,005 | 10/1994 | Van Prooijen et al. | 251/129.02 |
| 5,476,245 | 12/1995 | Augustin | 251/129.02 |

*Primary Examiner*—Denise L. Ferensic
*Assistant Examiner*—John Ball
*Attorney, Agent, or Firm*—David P. Gordon; David S. Jacobson; Thomas A. Gallagher

[57] ABSTRACT

An electrically operated trigger valve for a fuel injection pump includes a valve member secured to an armature to form an armature and valve member assembly. The valve member is slidably mounted in a bore and controls communication between the fuel inlet and a fuel outlet. In use, the valve is maintained in its closed position by energizing a stator coil to attract the armature. When the stator is de-energized the armature and valve member assemblies moved in the valve opening direction by a valve opening spring. The length of the valve opening spring is such that when the valve is in the fully open position a gap exists between one end of the opening spring and its adjacent seat. Accordingly, initial movement of the armature and valve member assembly in the closing position, upon subsequent energization of the state of coil, is not opposed by the spring until the gap has been eliminated by initial movement of the armature. This arrangement reduces the initial stator current necessary to produce movement of the armature and valve member assembly. It also permits a relatively stiff opening spring to be used, thereby reducing the impact with which the valve member engages the seat upon closing, and producing a rapid initial movement in the opening direction after de-energization of the stator coil.

11 Claims, 2 Drawing Sheets

ELECTRICALLY OPERATED TRIGGER VALVE FOR FUEL INJECTION PUMP

BACKGROUND OF THE INVENTION

1. Field of the Invention

This invention relates to an improved trigger valve for a fuel injection pump. Trigger valves are employed in certain high pressure fuel injection pumps to control the opening of a spill valve which is used to terminate each injection of fuel. The opening and closing of the trigger valve is controlled in light of engine operating requirements to ensure that the spill valve is opened precisely when required. This technique allows the moment of termination of each fuel injection to be accurately controlled by electronic means, thereby enabling the injection characteristics of the engine to be varied as required to optimise engine operating conditions.

2. State of the Art

A known trigger valve comprises a movable valve member which is connected to a soft iron armature. The valve member and armature are biased into a position corresponding to the trigger valve being open by a pre-loaded spring. In the open position of the trigger valve the armature is spaced from a stator coil by a small air gap. When the trigger valve is to be closed the stator coil is energised to attract the armature and thereby move the valve member against the force of the return spring to close the trigger valve.

In order to provide the precise control of the moment of closing of the trigger valve as required by modern high speed fuel injected engines the trigger valve must close rapidly and consistently when the stator coil is energised. Since the force with which the armature is attracted by the stator is at a minimum when the air gap between the stator and the armature is at its maximum (i.e. when the trigger valve is in its open position), and since in order to move the armature the pre-load of the valve opening spring must be overcome, it has in the prior art been necessary to pass a relatively large current through the stator coil in order to initiate movement of the valve member. This in itself is undesirable since it requires the stator coil to be manufactured in a manner which is capable of carrying the relatively high current and flux levels required, and similarly requires the control electronics to be designed to operate at high current levels.

Since the air gap between the armature and the stator decreases as the trigger valve moves from the open towards the closed position, the force generated on the armature by the stator coil would increase as the valve moves towards its fully closed position, if a constant stator coil current was employed. The resultant increasing speed of movement of the valve member and armature would result in an undesirably large impact of the valve member against its seat at the end of the available stroke. In order to reduce this impact force it has been proposed to reduce the stator coil current from its initial high value to a lower value after movement of the valve member/armature has commenced. Whilst this arrangement assists in reducing the impact forces it further adds to the complication of the control electronics.

SUMMARY OF THE INVENTION

According to one aspect of the present invention a valve for a fuel injection system comprising a valve member, an armature secured to the valve member, a stator coil for attracting the armature and valve member to move the valve from its open configuration to a closed configuration, and an opening spring which acts between an abutment surface and a spring seat provided on the valve member and armature assembly when the valve is in its closed configuration to bias the valve member and armature assembly towards the open configuration of the valve, is characterised in that the free length of the spring is less than the spacing between the abutment surface and the spring seat when the valve member and armature assembly are in the position corresponding to the valve being fully open so that the spring does not resist initial movement of the valve member and armature assembly away from the position corresponding to the fully open configuration of the valve.

The invention is of particular value as applied to the trigger valve of a fuel injection pump. It is to be understood, however, that the advantages of the present invention may be applicable to other electromagnetic valves for use in fuel injection systems, and all such valves are to be regarded as included within the scope of the present invention.

With such an arrangement the opening spring remains effective to initiate movement of the armature and valve member assembly from the closed configuration of the trigger valve towards the open configuration. However, since the free length of the spring is less than the spacing between the abutment and the spring seat when the armature and valve assembly are at their maximum spacing from the stator coil, the spring will not resist initial movement of the armature and valve assembly at the commencement of each closing stroke. This arrangement enables the initial current applied to the stator coil to be substantially reduced as compared with the arrangements of the prior art described above. Compression of the opening spring will not commence until the initial air gap between the armature and the stator has been partially closed by movement of the armature and valve member assembly. Thereafter, however, compression of the spring will resist movement of the armature and valve member assembly as the force produced on the armature by the current flowing through the stator coil increases. By appropriate choice of the spring characteristics of the opening spring, the opening spring will control movement of the valve member and armature assembly in such a manner as to obviate the need to reduce the stator coil current to avoid undesirably high impact levels.

Accordingly, in the preferred embodiment of the invention the previously perceived need to apply a variable current to the stator coil is removed and a relatively low and substantially constant current can be applied to the stator coil during the closing phase of the trigger valve. The relatively low level of initial current enables the stator coil to be manufactured to a lower current specification, and the absence of a requirement for variation in the stator current simplifies the required control electronics.

It is envisaged that in a typical embodiment of the invention the opening spring will operate over approximately one-half to two-thirds of the valve travel. With such an arrangement it is believed that the current required to drive the valve can be reduced by a factor of five as compared with the current required for prior art trigger valves of the type described above.

A further advantage of the invention is that because the opening spring does not resist initial movement of the valve member and armature assembly, the opening spring can be made stiff relative to opening springs of the prior art. Typically, opening springs of the prior art were made as light as possible consistent with the requirement to move the valve member and armature assembly away from the stator and into the position corresponding to opening of the trigger valve after de-energisation of the stator coil. In the present invention, a substantially stiffer spring, for example a spring having a stiffness of approximately 340N $mm^{-1}$ can be used. Such relatively stiff springs can be relatively easily manufactured to produce consistent characteristics, and the improved consistency of the spring characteristics will result in improved consistency in the operation of the trigger valve. This is particularly desirable in the case of a fuel injection pump for use with a high speed direct injection engine. With such engines, it has been found that under high speed low load conditions when minimum fuel delivery is required a relatively high level of trigger valve lift is required to initiate fuel spillage. It is therefore highly desirable for the trigger valve to open fully after each injection. In the case of the present invention it has been found that the relatively high force produced by the opening spring produces a relatively high speed of movement of the valve member and armature assembly during the initial phase of trigger valve opening, and that the momentum of the armature and valve member thereafter ensures that the trigger valve opens fully even at high operating speeds.

In a modified embodiment of the invention a second spring is provided which acts on the valve member and armature assembly in the direction opposite to the force applied to the valve member and armature assembly by the opening spring. The second spring has a low stiffness compared with the opening spring. In the absence of other forces acting on the valve member and armature assembly the second spring is sufficiently stiff to move the valve member and armature assembly to a position in which the opening spring is in engagement with both its abutment surface and the spring seat, but is substantially un-compressed. Thus, in the rest configuration of the components the valve member and armature assembly will be held in a position corresponding to the valve being about half way between its fully open and closed positions. With this arrangement, the armature will be somewhat closer to the stator coils than its position corresponding to the valve being fully open. Accordingly, a relatively large force can be generated on the armature by a relatively moderate current and accordingly the valve can rapidly be moved from its quiescent midway position to the fully closed position by energising the stator coil. When the stator coil is de-energised the valve member and armature assembly will be moved rapidly in a direction corresponding to opening of the valve by the opening spring, and the second spring will be compressed. When the valve member and armature assembly arrives at the position corresponding to the quiescent state of the assembly described above it will be travelling at significant velocity and the resultant momentum will continue to move the valve member in the opening direction to ensure that the valve opens fully. During this phase of movement the valve will be slowed down by the force applied to the valve member and armature assembly by the second spring with the result that when the valve member arrives at its fully open position its impact with its associated stop will be relatively soft. The second spring will thereafter return the valve to its equilibrium position pending commencement of the next cycle.

This arrangement offers a number of significant advantages. These advantages derive from the fact that the arrangement results in a reduction in the velocity of the valve member and armature assembly without adversely affecting closing or opening times. The reduction in velocity is particularly marked immediately before the valve member impacts its associated seat at the end of its closing stroke and immediately before it impacts its associated stop at the end of its opening stroke. It is believed that impact velocities can be reduced by a factor of 5 or thereabouts as a result of these improvements. Reduction in impact velocity substantially reduces cavitation in the fuel and substantially reduces mechanical impact of the valve member on its associated seat (during closing movement) and stop (during opening movement). These factors together significantly reduce the noise resulting from operation of the valve.

The above and further features and advantages of the present invention will be understood from the following description of a preferred embodiment of the present invention, reference being had to the accompanying drawings.

DETAILED DESCRIPTION OF THE PREFERRED EMBODIMENTS

Figure 1:
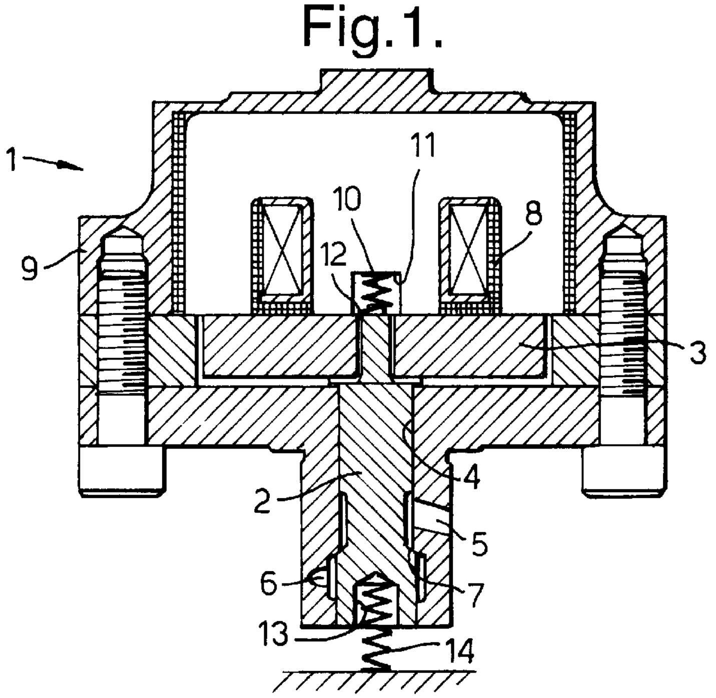
FIG. 1 shows schematically in transverse cross section a trigger valve assembly of a fuel injection pump with the various components in the position corresponding to the trigger valve being closed.

Referring firstly to FIG. 1, the illustrated trigger valve 1 comprises a valve member 2 secured to an armature 3 to form an armature and valve member assembly. The valve member 2 is slidably mounted in a bore 4 and controls communication between a fuel inlet 5 and a fuel outlet 6. In the configuration illustrated the valve member is in engagement with its associated seat 7 to isolate the inlet 5 from the outlet 6, i.e. the valve is in the "closed" configuration. The valve is, in use, maintained in its closed configuration by the action of a stator coil 8 which is fixed to the housing 9 of the trigger valve and acts on the armature 3. When the components are in the closed configuration illustrated in FIG. 1 a minimum air gap X (FIG. 2C), which in the case of the illustrated embodiment is typically about 0.1 mm, exists between the confronting faces of the armature 3 and the stator coil 8, and the valve member 2 is held against the seat 7 against the force of an opening spring 10. When it is desired to open the trigger valve 1 in order to initiate opening of the main spill valve the stator coil 8 is de-energised and the armature and valve member assembly moves downwardly as viewed in FIG. 1 under the influence of the opening spring 10 to move the valve member away from engagement with the seat 7 to allow communication between the fuel inlet 5 and the fuel outlet 6.

In prior art designs the spring 10 was designed to provide the minimum force necessary to effect the required opening of the trigger valve, and acted, in all working positions of the valve member and armature assembly, between an abutment 11 provided by the stator and a spring seat 12 provided on the armature.

Figure 2A:
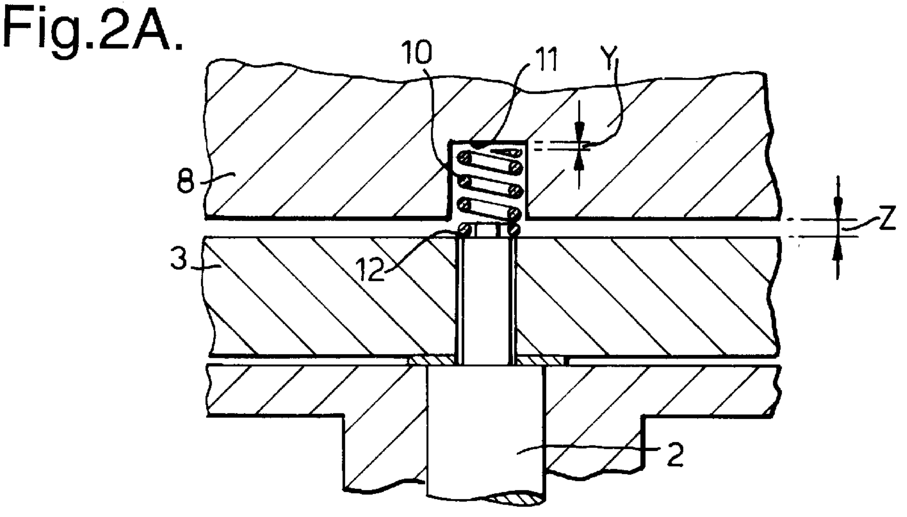
FIGS. 2A, 2B and 2C illustrate the relative position of the various internal components of the trigger valve of FIG. 1 when the valve is in the fully open, partly open, and fully closed configurations respectively.

Referring now to FIG. 2A, in the illustrated embodiment of the invention the free length of the opening spring 10 is less than the spacing between the spring seat 12 and abutment 11 when the valve member and armature assembly are in the illustrated position corresponding to the trigger valve being fully open. Accordingly, a gap Y exists between the upper end of the opening spring 10 and the abutment 11. In this configuration, the air gap between the armature 3 and the stator coil 8 is at its maximum Z.

Figure 2B:
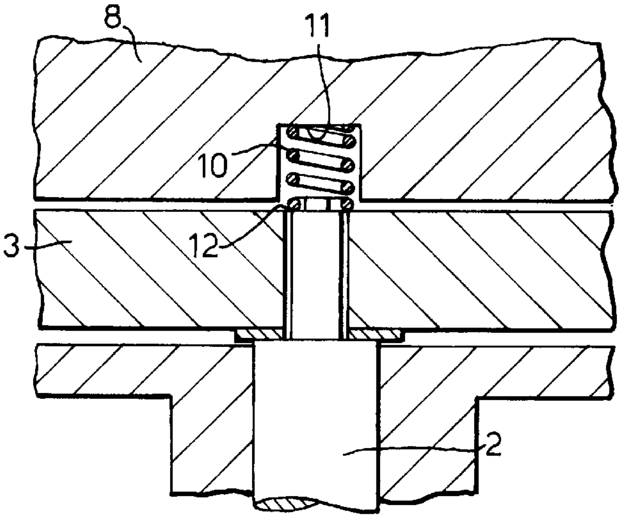
Figure 2C:
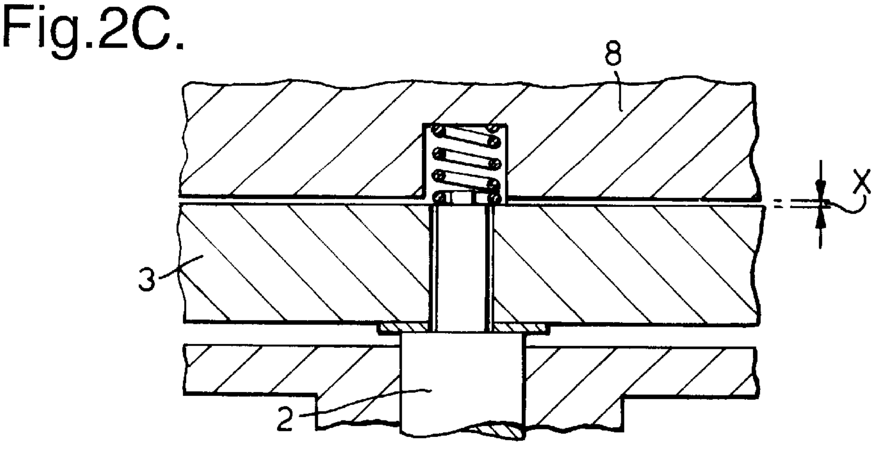

In order to initiate closure of the trigger valve the stator coil 8 is energised to attract the armature 3. Because of the gap Y between the opening spring 10 and the abutment 11 the opening spring will not resist initial movement of the valve member and armature assembly. The initial current which must be applied to the stator coil in order to initiate movement of the valve member and armature assembly is accordingly smaller than was necessary in the case of prior art devices in which the opening spring acted on the valve member/armature assembly, even when the trigger valve was fully open. After some initial movement of the valve member and armature assembly the gap Y will be closed and the opening spring 10 will accordingly begin to act to resist further movement of the valve member and armature assembly. This configuration is illustrated in FIG. 2B. Typically, the gap Y will be eliminated after approximately one third to one-half of the normal stroke of the valve member. By this time, the air gap between the stator coil and the armature will have been reduced and accordingly the force generated on the armature by the stator coil will be increased as compared with that which existed at the commencement of movement of the valve member and armature assembly and this force will be sufficient to compress the opening spring 10. The increased force available will, in fact, be sufficient to compress a relatively stiff spring, for example a spring having a stiffness of 340N $mm^{-1}$ in the case of the illustrated embodiment. The fully closed configuration of the trigger valve will occur when the valve member impacts the seat 7, and in this configuration the armature, stator and spring will be in the relative positions shown in FIG. 2C. The fact that the opening spring 10 is a relatively stiff spring means that in FIG. 2C configuration a large force is available to move the valve member and armature assembly towards the open position of the trigger valve when the stator coil 8 is de-energised. This large force will produce rapid movement of the valve member and armature assembly upon de-energisation of the stator coil, ensuring full opening of the trigger valve even under high operating speed conditions.

The correct gap Y between the end of the spring and the stator, when the valve is in the full open condition, can be established by manufacturing the various components to the required tolerances, or can be achieved by making the spring a sliding fit on the member to which it is secured, and then fixing the spring relative to the member to which it is secured, for example by welding, to position the free end of the spring at the correct position relative to the member to which it is secured. By this means, accumulative tolerances in respect of the components, and in particular tolerances in the length of the spring can be compensated for and the required gap can be maintained with the necessary accuracy under all circumstances.

Figure 3:
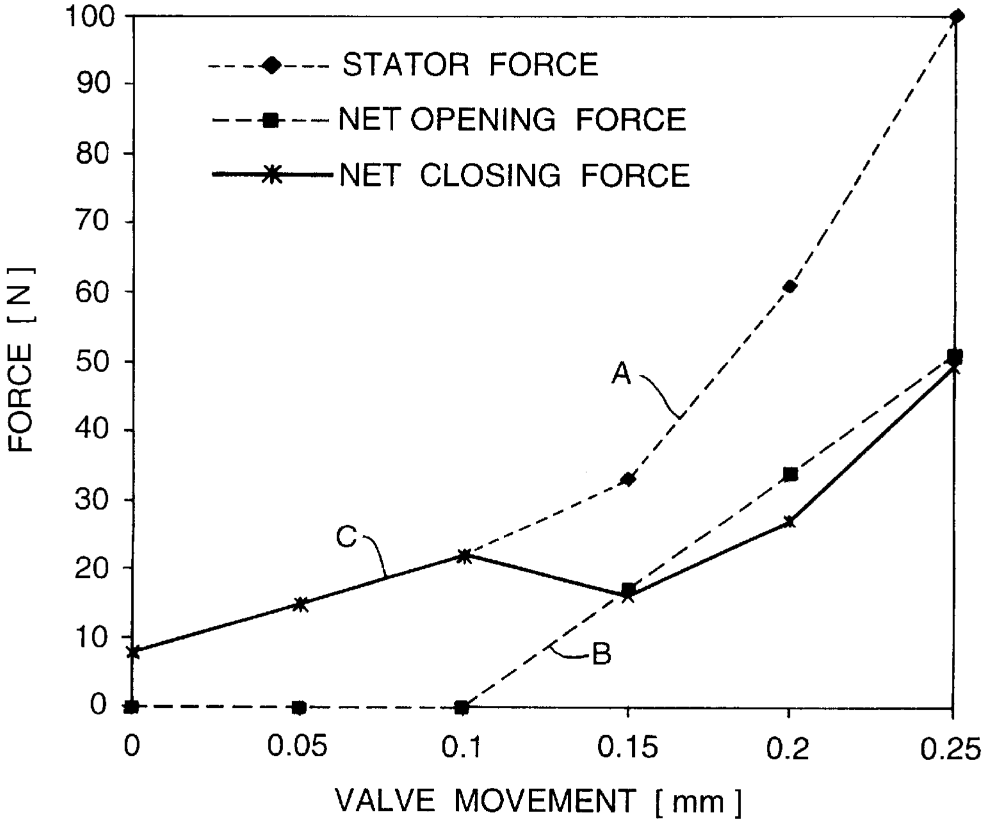
FIG. 3 illustrates the characteristics of trigger valve of FIG. 1.

Referring now to FIG. 3 the closing force produced by the action of a constant stator current on a movable armature of an embodiment of the invention is illustrated by curve A. It will be seen that as the valve movement increases (i.e. as the air gap between the stator and the armature decreases) the force produced by a constant current increases rapidly. The force produced by the opening spring 10 is plotted as curve B. Because of the gap Y, during initial movement of the valve member the opening spring 10 produces no force. Once the gap Y has been eliminated the force produced by the opening spring rises linearly. It will be appreciated, in practice, that the force of the opening spring 10 acts against (in the opposite sense) to the force produced on the armature by the stator. The curve C illustrates the net closing force on the valve member/armature assembly produced by the combined action of the stator coil current and the opening spring 10.

Whilst in the above described embodiment the opening spring 10 is secured to an extension of the valve member/armature assembly and accordingly in the fully open position of the valve clearance exists between the opening spring 10 and the stator, it is to be understood that in an alternative arrangement the opening spring 10 may be secured by appropriate means to the stator so that in the fully open configuration of the valve a gap is provided between the opening spring and the valve member/armature assembly.

In an alternative embodiment of the invention a second spring 14 is provided which acts on the valve member and armature assembly in the direction opposite to the force exerted on the valve member and armature assembly by the opening spring 10. The second spring 14 can conveniently be housed partially within a counterbore 13 provided in the valve member 2 and may react against an appropriate abutment surface provided for the purpose. The second spring 14 will have a low stiffness relative to the opening spring 10 but will be sufficiently stiff to ensure that, in the absence of other forces, the valve member and armature assembly will adopt a position corresponding to FIG. 2B—i.e. a configuration in which there is no gap between the opening spring 10 and its corresponding abutment surface 11 but in which the opening spring 10 is not substantially compressed. This may be regarded as a nominal rest or equilibrium position for the valve member and armature assembly. In this configuration, the gap between the armature 3 and the stator 8 is small relative to the gap Z which is present between these members when the valve is fully open. Accordingly, a particular level of current applied to the stator will produce a substantially larger force on the armature than would be the case if the same current was applied when the armature was in the position corresponding to the valve being fully open. Energising the stator coils will accordingly produce a large force on the armature and will result in rapid movement of the valve member and armature assembly into the position corresponding to the valve being fully closed. Because the valve member and armature assembly has to move a relatively small distance in order to effect complete closure of the valve the velocity which the valve member and armature assembly attains during such movement will be relatively small and accordingly there will be relatively little cavitation of the fuel and the impact of the valve member on its associated seat will be relatively small.

When the stator is de-energised the opening spring 10 will force the valve member and armature assembly in the direction tending to open the valve. This action will compress the second spring 14. The opening spring 10 will continue to act until the components arrive again at the configuration illustrated in FIG. 2B. Thereafter, as the valve member and armature assembly moves in the opening direction the opening spring 10 will be unable to exert any further force. However, the momentum of the valve member and armature assembly obtained as a result of the initial movement of the assembly under the influence of the opening spring 10 will be sufficient to propel the valve member and armature assembly into the fully open position. During such movement under the influence of momentum, however, the valve member and armature assembly will be slowed by the action of the second spring 14 with the result that by the time the valve member and armature assembly arrive at the position corresponding to the valve being fully open they will be travelling relatively slowly and will accordingly impact the end of travel stop with a relatively small force. Thereafter, the valve member and armature assembly will be returned to the equilibrium configuration by the action of the second spring 14.

A further advantage in the use of a second spring is that it largely eliminates any variations in performance which would otherwise result from a lack of squareness of the end of the opening spring 10. If the end of the spring is significantly out of square its stiffness for small deflections will reduce. The use of a second spring of an appropriate pre-load, for example 15N, permits reasonable variation in the end squareness of the opening spring whilst maintaining the required spring stiffness.

As has been noted above, the embodiments of the invention require a lower flux level and therefore lower current than was required in use of comparable devices of the prior art. It has been found that the reduced flux and current requirements have meant that the size of the armature and stator can be reduced as compared with those required by the prior art without reduction in functional efficiency. Indeed, by reducing the mass of the armature the valve is made more responsive to the forces produced by the stator current. The reduction in armature and stator size reduces the overall size and, most importantly, reduces the weight of the resultant unit. Such reductions are highly desirable in components in the automotive industry.

What is claimed is:

1. A valve for a fuel injection system comprising a valve member, an armature secured to the valve member, a stator coil for attracting the armature and valve member to move the valve from its open configuration to a closed configuration, and an opening spring which acts between an abutment surface and a spring seat provided on the valve member and armature assembly when the valve is in its closed configuration to bias the valve member and armature assembly towards the open configuration of the valve, wherein the free length of the opening spring is less than the spacing between the abutment surface and the spring seat when the valve member and armature assembly are in the position corresponding to the valve being fully open so that the spring does not resist initial movement of the valve member and armature assembly away from the position corresponding to the fully open configuration of the valve.

2. A valve according to claim 1 wherein the abutment surface against which the opening spring acts is provided by a stator of the valve.

3. A valve according to claim 1 wherein the free length of the opening spring is such that the opening spring will operate to resist movement of the valve member and armature assembly over between one-half and two-thirds of the total valve travel.

4. A valve according to claim 1 wherein the opening spring, when compressed, exerts a substantially higher force than is required to move the valve member and armature assembly away from the stator upon de-energisation of the stator coil.

5. A valve according to claim 4 wherein the opening spring has a stiffness of approximately 340N $mm^{-1}$.

6. A valve according to claim 1 wherein a second spring is provided to act on the valve member and armature assembly in the direction opposite to the force applied to the valve member and armature assembly by the opening spring.

7. A valve according to claim 6 wherein the second spring has a low stiffness compared with that of the opening spring.

8. A valve according to claims 6 wherein the second spring acts on the valve member and armature assembly in all operative positions of the valve member and armature assembly.

9. A valve according to claim 6 wherein the opening spring and the second spring are both compression springs and operate on opposite ends of the valve member and armature assembly.

10. A valve according to claim 7 wherein the opening spring and the second spring are both compression springs and operate on opposite ends of the valve member and armature assembly.

11. A valve according to claim 8 wherein the opening spring and the second spring are both compression springs and operate on opposite ends of the valve member and armature assembly.

* * * * *